US008473739B2

(12) United States Patent
Clinick et al.

(10) Patent No.: US 8,473,739 B2
(45) Date of Patent: Jun. 25, 2013

(54) ADVANCED CONTENT AUTHENTICATION AND AUTHORIZATION

(75) Inventors: Andrew J. Clinick, Issaquah, WA (US); Peter J. Torr, Kirkland, WA (US); Sean Hayes, Bristol (GB)

(73) Assignee: Microsoft Corporation, Redmond, WA (US)

(*) Notice: Subject to any disclaimer, the term of this patent is extended or adjusted under 35 U.S.C. 154(b) by 1050 days.

(21) Appl. No.: 11/607,297

(22) Filed: Nov. 30, 2006

(65) Prior Publication Data

US 2008/0134297 A1 Jun. 5, 2008

(51) Int. Cl.
*G06F 21/00* (2006.01)

(52) U.S. Cl.
USPC ........... 713/166; 713/164; 713/165; 713/167; 713/168; 713/169; 726/1; 726/3; 726/4; 726/27; 726/28; 726/29; 726/30; 709/227; 709/228; 709/229

(58) Field of Classification Search
USPC ................ 713/163–168, 182–186; 726/1, 22, 726/27–30; 709/227–229
See application file for complete search history.

(56) References Cited

U.S. PATENT DOCUMENTS

| | | | |
|---|---|---|---|
| 5,892,904 A * | 4/1999 | Atkinson et al. ................ | 726/22 |
| 6,223,292 B1 | 4/2001 | Dean et al. | |
| 6,883,097 B1 | 4/2005 | Lotspiech et al. | |
| 6,976,076 B2 * | 12/2005 | Shrader et al. ................ | 709/228 |
| 7,007,170 B2 | 2/2006 | Morten | |
| 2001/0043533 A1 | 11/2001 | Hahnfeld et al. | |
| 2003/0126136 A1 | 7/2003 | Omoigui | |
| 2003/0225697 A1 | 12/2003 | DeTreville | |
| 2004/0093515 A1 * | 5/2004 | Reeves, Jr. .................... | 713/201 |
| 2004/0133794 A1 | 7/2004 | Kocher et al. | |
| 2004/0139202 A1 * | 7/2004 | Talwar et al. ................. | 709/229 |
| 2004/0158741 A1 | 8/2004 | Schneider | |
| 2004/0236588 A1 | 11/2004 | Millard et al. | |
| 2005/0005137 A1 | 1/2005 | Benedikt | |
| 2005/0186998 A1 | 8/2005 | Haas | |
| 2005/0267844 A1 | 12/2005 | Gallant et al. | |

(Continued)

FOREIGN PATENT DOCUMENTS

KR 10-2004-0020933 A 3/2004
WO WO 2007057812 * 5/2007

OTHER PUBLICATIONS

Zhichen et. al, "Safety Checking code", 20002 ACM.*

(Continued)

*Primary Examiner* — Taghi Arani
*Assistant Examiner* — Josnel Jeudy
(74) *Attorney, Agent, or Firm* — Microsoft Corporation

(57) ABSTRACT

An interactive multimedia presentation playable by a presentation system includes a media content component and an interactive content component. The interactive content component includes one or more applications, which provide instructions for organizing, formatting, and synchronizing the presentation of interactive objects to a user. Prior to playing the interactive multimedia presentation, an entity responsible for authoring or publishing one or more of the applications is digitally identified and authenticated, or it is determined that the applications are unsigned. Prior to and/or during play of the interactive multimedia presentation, authorization for performing certain actions (such as executing certain application instructions, especially those that access functionality of the presentation system, computer-readable media, or external networks) is granted via a permission-based model. User input and application requests may be considered in determining whether an application is granted permission to perform certain actions.

9 Claims, 9 Drawing Sheets

U.S. PATENT DOCUMENTS

| | | |
|---|---|---|
| 2006/0010226 A1 | 1/2006 | Hurtta et al. |
| 2006/0153017 A1 | 7/2006 | Kim |
| 2011/0219229 A1* | 9/2011 | Cholas et al. ................. 713/168 |
| 2011/0263306 A1* | 10/2011 | Nakamura et al. ................. 463/4 |
| 2011/0289506 A1* | 11/2011 | Trivi et al. .................... 718/104 |

OTHER PUBLICATIONS

"DLNA Overview and Vision Whitepaper 2006", http://www.dlna.org/industry/about/dlna_white_paper_2006.pdf#search=%22Advanced%20Content%20Authentication%20and%20Authorization%20media%20player%20DVD%2Bodf%22.

Liu et al., "Digital Rights Management for Content Distribution", Date: 2003, http://crpit.com/confpapers/CRPITV21ALiu.pdf#search=%22Advanced%20Content%20Authentication%20and%20Authorization%20media%20player%20DVD%2Bodf%22.

* cited by examiner

ADVANCED CONTENT AUTHENTICATION AND AUTHORIZATION

BACKGROUND

Multimedia players are devices that render combinations of video, audio or data content ("multimedia presentations") for consumption by users. Multimedia players such as DVD players currently do not provide for much, if any, user interactivity during play of media content—media content play is generally interrupted to receive user inputs other than play speed adjustments. For example, a user of a DVD player must generally stop the movie he is playing to return to a menu that includes options allowing him to select and receive features such as audio commentary or effects, actor biographies, or games.

Interactive multimedia players are hardware, software, firmware, or any combination thereof that render combinations of interactive content alone or concurrently with traditional video, audio or data content ("interactive multimedia presentations"). Interactive content includes resources such as interactive objects, which are user-selectable visible or audible objects presentable alone or concurrently with traditional video, audio or data content. One or more applications provide instructions for organizing, formatting, and synchronizing the presentation of interactive objects to a user. Although any type of device may be or include an interactive multimedia player, devices such as optical media players (for example, DVD players), computers, and other electronic devices are particularly well positioned to enable the creation of, and consumer demand for, commercially valuable interactive multimedia presentations because they provide access to large amounts of relatively inexpensive, portable data storage.

Applications are generally configured to access various resources, such as functions of an interactive multimedia player (applications may pass data to/from the functions of the interactive multimedia player to provide a wide variety of user experiences, for example), and interactive objects and other resources stored in persistent storage or networks. Unscrupulous application authors or publishers could use certain resource accesses for malicious purposes such as gaining access to confidential user information or introducing dangerous or disruptive programs into interactive multimedia players.

To enhance investment in interactive multimedia players and interactive multimedia presentations, it is desirable that interactive multimedia players protect consumers against execution of potentially malicious interactive content, while providing predictable functionality associated with playing video, audio or data content.

SUMMARY

An interactive multimedia presentation playable by a presentation system generally includes a media content component and an interactive content component. One example of media content is a movie, but media content may be video, audio, data, or any combination thereof. Interactive content is in the form of one or more applications, which provide instructions for organizing, formatting, and synchronizing the presentation of interactive objects to a user, often concurrently with media content. An application includes computer-executable instructions.

Methods, systems, apparatuses, and articles of manufacture for playing applications are discussed herein. For exemplary purposes, applications associated with interactive multimedia presentations are discussed. Entities that author or publish applications are digitally identified/authenticated, and execution of specific application instructions is authorized using a permission-based model. User input and application requests may be considered in determining whether an application is granted permission to perform certain actions. Authentication is generally established independent of authorization.

Applications may be authorized to perform various, virtually unlimited, permitted actions and combinations thereof. In one scenario, permitted actions are authorized, and an operating mode of an application established, based on a level of access to resources. For example, execution of application instructions that access resources such as various predefined application programming interfaces ("APIs"), markup elements, computer-readable media, external network locations may be permitted or denied. Authorization to perform permitted actions may be granted prior to and/or during execution of an application.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
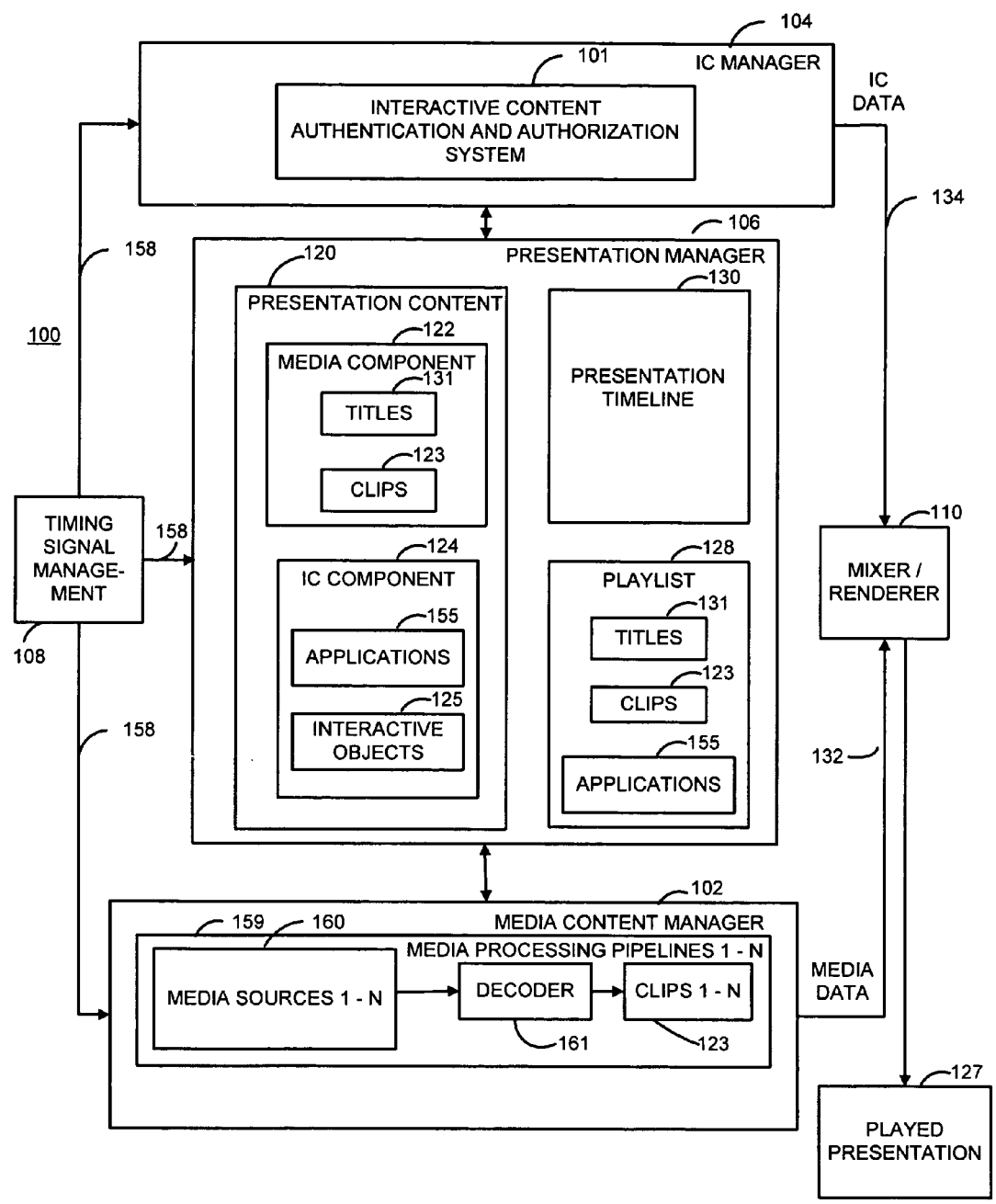
FIG. 1 is a simplified functional block diagram of an interactive multimedia presentation system.

Authentication and authorization models for applications are discussed herein. Applications associated with interactive multimedia presentations are discussed for exemplary purposes. An application includes computer-executable instructions. Execution of certain application instructions, especially those that access resources associated with a presentation system, computer-readable media, or external network locations, could result in the occurrence of malicious or unwanted actions such as obtaining confidential user information, introducing viruses, or inducing hardware failures.

One authentication-related step that occurs prior to playing an application is determining whether an entity that authored or published certain applications is recognized. One way to identify the entity is via a digital identity such as a digital signature file. In an exemplary implementation, the digital signature file is stored in a predetermined location and includes a signed digital certificate issued by a third party authority and a verifiable hash value. If a digital identity is not found (in the case of home-authored applications, for example), the applications may be deemed to be unsigned. If a digital identity is found, the applications are deemed to be signed, and it can then be determined whether the digital identify is trusted and valid. If the digital identity is not trusted or valid (for example, the entity is not known, the signed digital certificate has been revoked, or the digital signature file has been tampered with), it may be desirable for all or part of the interactive multimedia presentation to be deemed un-playable.

Assuming the digital identity is deemed to be trusted and valid, or if applications are known to a user by some other means, such as when a title is under development and is being tested, the authorization for execution of specific application instructions is provided via a permission-based model. User input may be considered to determine what actions the application is permitted to perform. An application may also request and/or query certain permissions. Generally, an application only receives the minimum permissions needed to operate.

Certain authorization-related actions taken prior to and/or during play of an interactive multimedia presentation include evaluating a security policy and/or resource access condition to determine an operating mode of the application. The operating mode of the application is generally based on whether access to various predefined resources such as application programming interfaces ("APIs"), markup elements, computer-readable media locations, or external network locations is permitted or denied. In one exemplary scenario, there are three permitted modes of operation for an application (in addition to a mode where the application is deemed to be un-playable), which generally correspond to a level of interactivity experienced by a user: in a first mode, the application has unrestricted resource access (allowing a user to receive/select all or a wide variety of interactive features, for example); in a second mode, the application may access only a predetermined set of resources (allowing a user to receive only basic interactive menus, for example); and in a third mode the application is not permitted to access any external resources (in this case, the user may not be allowed to receive/select any interactive features).

Aspects of the authentication and authorization functionality described herein are provided by an interactive content authentication and authorization system. In one implementation, the interactive content authentication and authorization system is implemented within a presentation system for playing interactive multimedia presentations. The presentation system may be implemented using any configuration of software, hardware, firmware, or combinations thereof. Exemplary presentation systems include operating systems, DVD players, portable media players, and personal computers. Presentation systems are optionally compliant with one or more specifications or standards.

Turning to the drawings, where like numerals designate like components, FIG. 1 is a simplified functional block diagram of an interactive multimedia presentation system ("Presentation System") 100. Presentation System 100 includes a media content manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a media content component ("media component") 122 and an interactive content component ("IC component") 124. Media component 122 and IC component 124 are generally, but need not be, handled as separate data streams, by media content manager 102 and IC manager 104, respectively.

Presentation System 100 also facilitates presentation of Presentation Content 120 to a user (not shown) as played presentation 127. Played presentation 127 represents the user-received (for example, visible, audible, or otherwise perceivable) information associated with Presentation Content 120 that is produced by mixer/renderer 110 and receivable by the user via devices such as displays or speakers (not shown). For discussion purposes, it is assumed that Presentation Content 120 and played presentation 127 represent high-definition DVD movie content, in any format. It will be appreciated, however, that Presentation Content 120 and Played Presentation 127 may be configured for presenting any type of presentation of media content now known or later developed.

Media component 122 represents the traditional video, audio or data components of Presentation Content 120. For example, a movie generally has one or more versions (a version for mature audiences, and a version for younger audiences, for example); one or more titles 131 with one or more chapters (not shown) associated with each title (titles are discussed further below, in connection with presentation manager 106); one or more audio tracks (for example, the movie may be played in one or more languages, with or without subtitles); and extra features such as director's commentary, additional footage, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions. It will also be appreciated that although media component 122 is referred to as a movie, media component 122 may in fact be video, audio, data, or any combination thereof.

Sets of media samples (for example, sets of video, audio, or data samples) that form media component 122 are referred to as clips 123 (clips 123 are shown within media component 122, media content manager 102, and playlist 128). Referring to media content manager 102, information associated with clips 123 is handled by one or more processing units, such as media processing pipelines 159 (one media processing pipeline, labeled 1-N, is shown to indicate that any number of media processing pipelines are possible). Within a particular media processing pipeline 159, information associated with clips 123 is received from a media source 160 and demultiplexed, decoded, and/or decrypted at a decoder block 161.

A particular media source 160 is any device, location, or data from which video, audio, or data is derived or obtained. Examples of media sources include, but are not limited to, user input devices, networks, data structures, or computer-readable media.

Media data 132 is data associated with media component 122 that has been prepared for rendering by media content manager 102 and transmitted to mixer/renderer 110. Sets (for example, frames) of media data 134 generally include, for each active clip 123, a rendering of a portion of the clip. The exact portion or amount of the clip rendered in a particular set of media data may be based on several factors, such as the characteristics of the video, audio, or data content of the clip or one or more parameters associated with the media source from which the media data is derived (for example, codec parameters or settings and encryption parameters or settings).

Referring again to Presentation Content 120, IC component 124 includes interactive objects 125, which are optionally presentable concurrently with media component 122, along with any instructions (shown as applications 155 and discussed further below) for presenting the interactive objects. Interactive objects 125 may be static or animated. Examples of interactive objects include, among other things, video samples or clips, audio samples or clips, images, graphics, text, and combinations thereof.

Interactive objects 125 originate from one or more sources (not shown). A source is any device, location, or data from which interactive objects are derived or obtained. Examples of sources for interactive objects 125 include, but are not limited to, user input devices, networks, data structures, computer-readable media, or information obtained from applications (associated with the same or different processes or machines). Examples of formats of interactive objects 125 include, but are not limited to, portable network graphics ("PNG"), joint photographic experts group ("JPEG"), moving picture experts group ("MPEG"), multiple-image network graphics ("MNG"), extensible markup language ("XML"), hypertext markup language ("HTML"), extensible HTML ("XHTML"), extensible stylesheet language ("XSL"), and WAV.

Applications 155 provide the mechanism by which Presentation System 100 presents interactive objects 125 to a user. Applications 155 represent any signal processing method or stored instruction(s) that electronically control predetermined operations on data. In one implementation, applications are authored to execute on presentation systems in compliance with one or more Specifications for High-Definition Video published by the DVD Forum.

It is assumed for discussion purposes that IC component 124 includes three applications 155, which are discussed further below in connection with FIG. 2. The first application presents, concurrently with visual aspects of the movie, certain interactive objects that provide a menu having multiple user-selectable items; the second application presents one or more interactive objects that provide graphic overlays (such as circles) that may be used to identify and/or follow one or more items appearing in the movie (a person, a car, a building, or a product, for example); and the third application presents a media clip such as an animated thumbnail (referred to as a "script clip"). Applications 155, either alone or in response to user events, may determine when media data associated with clips 123 or interactive objects 125 are presented to a user.

IC manager 104 includes, among other things (not shown), an interactive content authentication and authorization system 101 (hereinafter referred to as "ICAA System" 101, which is shown and discussed in detail in connection with FIG. 4). ICAA System 101 is responsible for authenticating entities that author or publish applications 155, and for implementing a permission-based model for resource access by applications 155. Resources are physical or logical components managed by application 155 on an individual basis. Examples of resources accessed by a particular application include but are not limited to other applications/instructions, persistent and non-persistent memory locations, network locations, media processing pipelines 159, presentation manager 106 and components thereof, IC manager 104 and components thereof, mixer/renderer 110 and components thereof, and timing signal management block 108 and components thereof. Specifications for High-Definition Video published by the DVD Forum set forth various objects and methods associated with DVD players that are accessible via script APIs and markup elements. Generally, applications 155 use instructions such as script or markup commands to access resources (script 308 and markup 303 are shown and discussed in connection with FIG. 3), although any type of instructions are possible.

Interactive content data ("IC data") 134 is data associated with IC component 124 that has been prepared for rendering by IC manager 104 and transmitted to mixer/renderer 110. Each application has an associated queue (not shown), which holds one or more work items (not shown) associated with rendering the application.

Presentation manager 106, which is configured for communication with media content manager 104, IC manager 102, mixer/renderer 110, and timing signal management block 108, facilitates handling of Presentation Content 120 and presentation of played presentation 127 to the user. Presentation manager 106 has access to a playlist 128. Playlist 128 includes, among other things, a time-ordered sequence of clips 123 and applications 155 (including interactive objects 125) that are presentable to a user. The clips 123 and applications 155/interactive objects 125 may be arranged to form one or more titles 131. For exemplary purposes, one title 131 is discussed herein. Playlist 128 may be implemented using an extensible markup language ("XML") document, or another data structure.

Presentation manager 106 uses playlist 128 to ascertain a presentation timeline 130 for title 131. Conceptually, presentation timeline 130 indicates the times within title 131 when specific clips 123 and applications 155 are presentable to a user. A sample presentation timeline 130, which illustrates exemplary relationships between presentation of clips 123 and applications 155 is shown and discussed in connection with FIG. 2.

In operation, presentation manager 106 provides information, including but not limited to information about presentation timeline 130, to media content manager 102 and IC manager 104. Based on input from presentation manger 206, media content manager 102 prepares media data 132 for rendering, and IC manager 104 prepares IC data 134 for rendering.

Timing signal management block 108 produces various timing signals 158, which are used to control the timing for preparation and production of media data 132 and IC data 134 by media content manager 102 and IC manager 104, respectively. In particular, timing signals 158 are used to achieve frame-level synchronization of media data 132 and IC data 134. Details of timing signal management block 108 and timing signals 158 are not discussed specifically herein.

Mixer/renderer renders media data 132 in a video plane (not shown), and renders IC data 134 in a graphics plane (not shown). The graphics plane is generally, but not necessarily, overlayed onto the video plane to produce played presentation 127 for the user.

Figure 2:
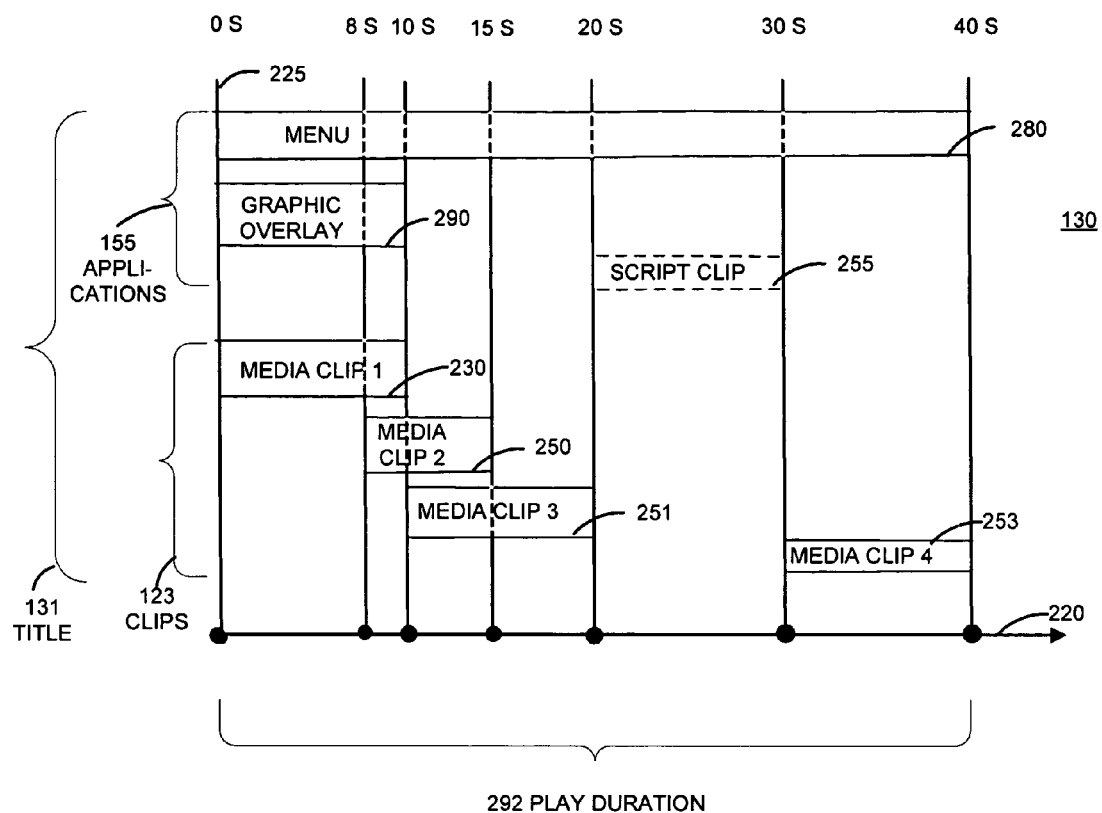
FIG. 2 is a graphical illustration of an exemplary presentation timeline, which is ascertainable from the playlist shown in FIG. 1.

With continuing reference to FIG. 1, FIG. 2 is a graphical illustration of a sample presentation timeline 130 for title 131 within playlist 128. Time is shown on horizontal axis 220. Information presentable within title 131, specifically about media component 122 (clips 123 are illustrated) and IC component 124 (applications 155, which present interactive objects 125, are illustrated)—is shown on vertical axis 225.

Regarding clips 123 associated with media component 122, four clips 123 are shown: a first media clip ("media clip 1") 230, a second media clip ("media clip 2") 250, a third media clip ("media clip 3") 251, and a fourth media clip ("media clip 4") 253. Media clip 1 230 is playable from zero seconds to 10 seconds, media clip 2 250 is playable from eight seconds to 15 seconds, media clip 3 251 is playable from 10 seconds to 20 seconds, and media clip 4 253 is playable from 30 seconds to 40 seconds. No media content is scheduled by playlist 128 for play between 20 seconds and 30 seconds, although an application 155 may present script clip 255 for play between 20 seconds and 30 seconds. Script clip is a media clip, such as an animated thumbnail, which is not generally included in the playlist, but which may be optionally invoked (automatically or by a user) via an application at variable times (such as when no media content is scheduled for play, or when media content play has been paused) within played presentation 127.

Regarding IC component 124, as discussed above in connection with FIG. 1, one application is responsible for presenting certain interactive objects that provide user-selectable items (for example, buttons with associated text or graphics) of menu 280. Another application is responsible for presenting one or more interactive objects that provide graphic overlay 290. As shown, menu 280 is displayed concurrently with media clips 1 through 4, and graphic overlay 290 is displayable concurrently with media clip 1 230 and a portion of media clip 2. A third application is responsible for presenting script clip 255 when there is no media content scheduled for presentation (as shown, script clip 255 is playable between 20 seconds and 30 seconds).

The particular amount of time along horizontal axis 220 in which title 131 is presentable to the user is referred to as play duration 292 of title 131. Specific times within play duration 292 are referred to as title times. Because a title may be played once or may be played more than once (in a looping fashion, for example) play duration 292 is determined based on one iteration of title 131. Play duration 292 may be determined with respect to any desired reference, including but not limited to a predetermined play speed (for example, normal, or 1×, play speed), a predetermined frame rate, or a predetermined timing signal status.

It will be appreciated that implementation-specific factors such as display techniques, and specific rules regarding play sequences and timing relationships among clips and interactive objects for each title may impact upon exact values of a title's play duration and title times therein. The terms play duration and title times are intended to encompass all such implementation-specific details.

Although title times at/within which content associated with IC component 124 is presentable are generally predetermined, it will be appreciated that actions taken when the user interacts with such content may only be determined based on user input while Played Presentation 127 is playing. For example, the user may select, activate, or deactivate certain applications, interactive objects, and/or additional content associated therewith during play of Played Presentation 127.

Figure 3:
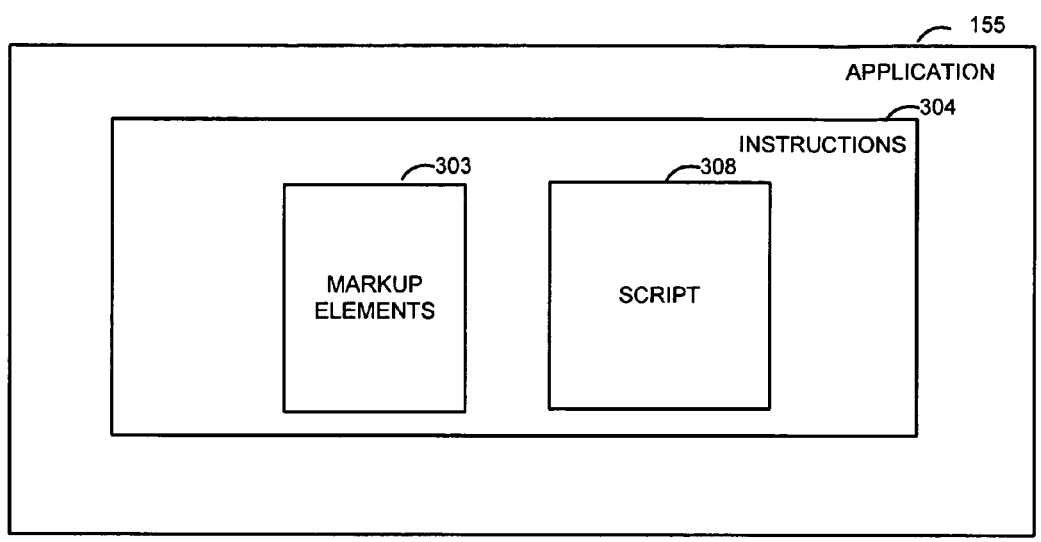
FIG. 3 is a simplified functional block diagram of an application associated with the interactive multimedia presentation shown in FIG. 1.
Figure 4:
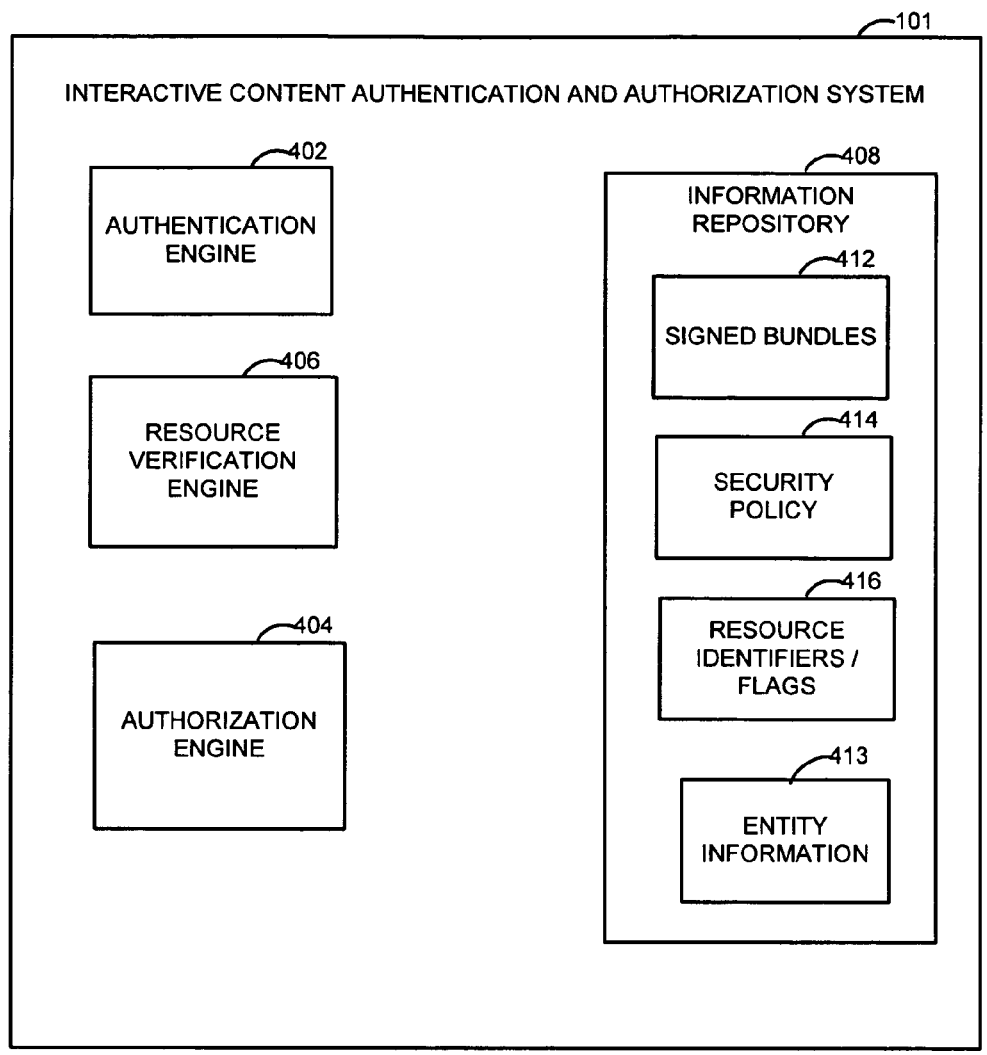
FIG. 4 is a simplified functional block diagram illustrating the interactive content authentication and authorization system of FIG. 1 in more detail.

With continuing reference to FIGS. 1 and 2, FIG. 3 is a functional block diagram of a single application 155. Application 155 is generally representative of applications responsible for presenting interactive objects 280, 290, and 255 (shown in FIG. 2). Application 155 includes instructions 304. Instructions 304 may be in any form or programming language, (examples include but are not limited to declarative form, imperative form, functional form, or logical form). Script 308 includes instructions in imperative form. Markup elements 303 represent instructions 304 written in a declarative programming language, such as Extensible Markup Language ("XML").

Instructions 304, when executed, perform tasks (among other tasks) related to rendering of interactive objects 125 associated with application 155 based on user input. User inputs may change the state of the media source (for example, pause inputs, fast-forward inputs, slow-forward inputs, fast-reverse inputs, or slow-reverse inputs), and control user interaction with interactive objects within played presentation 127, such as selection of a button within menu 280, selection of the circle associated with graphical overlay 290, or invocation of script clip 255. Instructions 304 can also draw or re-draw graphics, re-format video, or perform file input/outputs or network connections. User inputs may occur using any type of user input device now known or later developed, including a keyboard, a remote control, a mouse, a stylus, or a voice command. It will be appreciated that application 155 may also perform tasks unrelated to user inputs.

In some cases, execution of instructions 304 that access certain resources, such as markup elements, APIs of Presentation System 100, interactive objects 125 or other resources stored in computer-readable media locations (such as persistent storage locations or other memory locations) or external network locations, may result in a heightened potential for the occurrence of malicious or unwanted actions (for example, obtaining confidential user information, introducing viruses, or inducing hardware failures). This is often the case in an environment where many interactive features are provided—multiple applications 155 may issue commands, and the number and/or amount of resources associated with an application that are loaded into memory during execution of the application necessitates the loading and unloading of resources from memory.

With continuing reference to FIGS. 1-3, FIG. 4 is a simplified functional block diagram illustrating various components of ICAA System 101, which is responsible for authenticating entities that author or publish applications 155, and for implementing a permission-based model for resource access by applications 155. ICAA System 101 includes: an authentication engine 402; an authorization engine 404; a resource verification engine 406; and an information repository 408, which represents general data storage capability for information, and which references various kinds of data used by components of ICAA System 101, such as signed bundles 412, entity information 413, security policy 414, and resource identifiers/flags 416.

In general, design choices dictate how specific functions of ICAA System 101 are implemented, if at all. Such functions may be implemented using hardware, software (for example, runtime APIs associated with aspects of Presentation System 100), firmware, or combinations thereof. It will also be appreciated that implementations of the functions of ICAA System 101 are tailored to the particular environment in which ICAA System 101 operates (details of exemplary operating environments are discussed in connection with FIG. 9).

Authentication engine 402 is responsible for identifying entities that author or publish applications 155, and verifying the integrity of applications and other content purported to be authored or published by a particular entity. Signed bundles 412 and entity information 413 are generally used in connection with the functions of authentication engine 402.

Authorization engine 404 is responsible for authorizing applications 155 to perform certain actions using a permission-based model. Resource verification engine 406 is responsible for verifying the integrity of certain resources/resource accesses during play of applications 155. Security policy 414 and resource identifiers/flags 416 are generally used in connection with the functions of authorization engine 404 and/or resource verification engine 406.

With continuing reference to FIGS. 1-4, FIG. 5 is a flowchart of a method for using aspects of ICAA System 101 to start-up play of an interactive multimedia presentation using a presentation system, such as Presentation System 100, and for selecting an operating mode for interactive content, such as IC component 124, of the presentation. For exemplary purposes, IC component 124 is assumed to include the three applications 155 discussed in connection with FIG. 2, all authored and published by a single entity and listed in a single playlist on or accessible via a computer-readable medium (computer-readable media are discussed in connection with FIG. 8). It will be appreciated, however, that any number of applications and/or playlists, authored or published by any number of entities, are possible.

The method begins at block 500, and continues at diamond 502, where upon identification of applications 155, it is determined whether a digital identity of the entity that authored or published the applications is identifiable. If a digital identity is not identifiable, then the applications are deemed to be "unsigned." Generally, applications created by consumers for personal use are unsigned. If a digital identity is identifiable, then the applications are deemed to be "signed." Movie studios and other commercial entities generally produce signed interactive content for distribution to wide audiences. In the context of Presentation System 100, authentication engine 402 is generally responsible for identification and verification of the digital entity.

A digital identity is any technique or data structure used to identify a source of interactive content. One type of digital identity is a digital signature. A digital signature is a cryptographically based electronic signature. Techniques and infrastructure for creating digital signatures are well known. Generally, an entity authoring and/or publishing digital content requests a digital identity certificate from a third party certificate authority, and uses the digital identity certificate to sign certain digital content. The digital signature is generated using a private key and a signing algorithm. The key and/or serial number used in the signing algorithm are tied to human-readable information about the author/publisher (such as a studio name and/or address) by the digital identity certificate.

In the context of Presentation System 100, a digital identity is used to assure authenticity of certain interactive content, referred to herein as "securable content", which may impact upon the security of Presentation System 100. Securable content includes but is not limited to applications 155 or instructions thereof, files associated with applications, or resources accessed by applications. Examples of securable content are playlist files, manifest files, markup files, script files, timing files, subtitle files, style sheet files, certificate files, certificate revocation lists, and interactive object files. Particular securable content that is listed in one or more files of predetermined types/locations and associated with a particular digital identity in a verifiable manner is referred to as "secured content".

Figure 5:
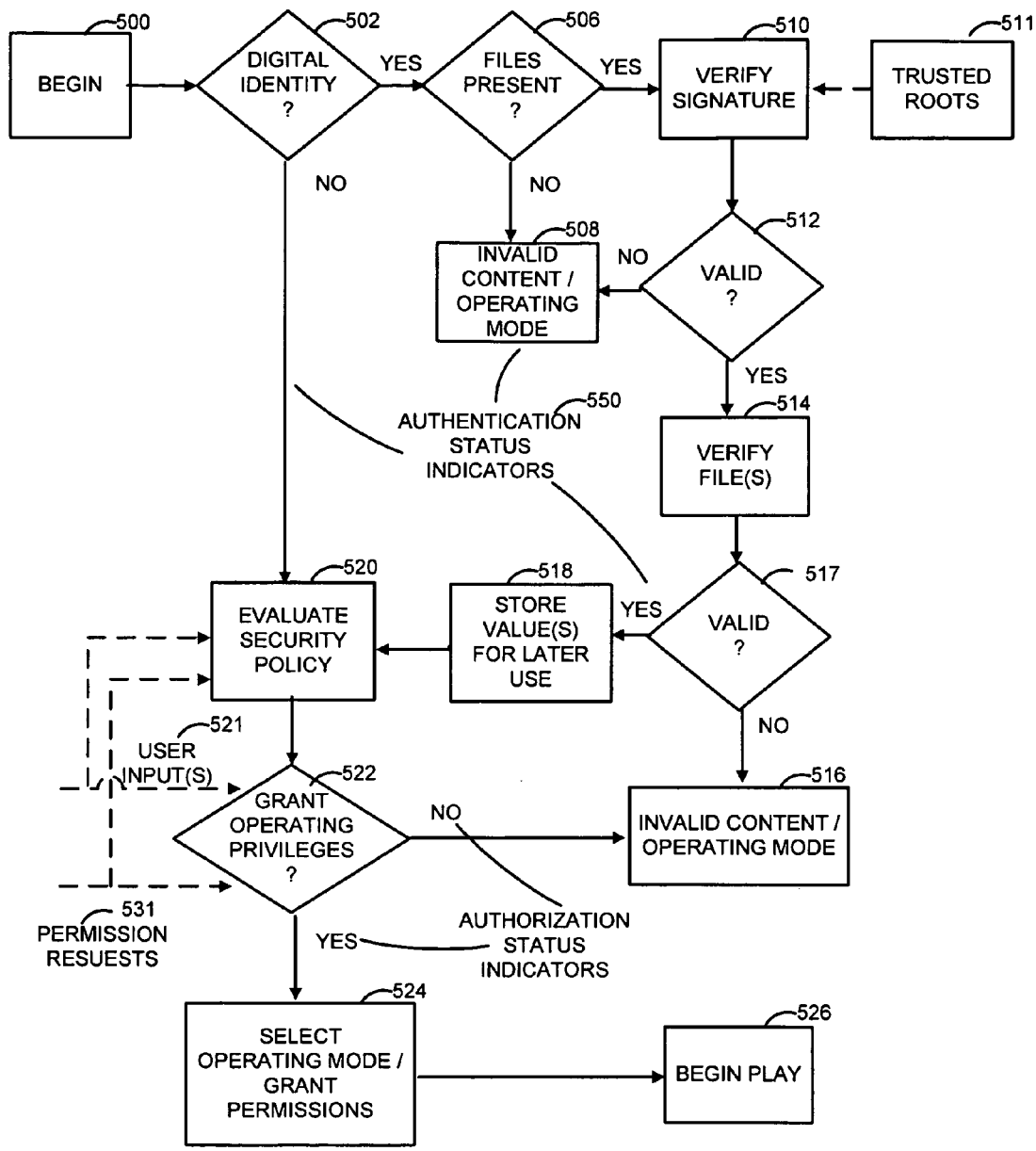
FIG. 5 is a flowchart of a method for using aspects of the interactive content authentication and authorization system of FIG. 4 to start-up play of an interactive multimedia presentation.

Referring to the flowchart of FIG. 5, at diamond 506 it is determined whether one or more files of predetermined types/locations, which identify secured content, are present. If, as indicated at block 508, files of predetermined types/locations are required but not present, it is desirable to deem the interactive multimedia presentation/interactive content invalid. It is not recommended that invalid interactive content be played (in this situation, the operating mode of the interactive content may be considered to be "invalid" or "non-operational"), although exact behavior may be defined by particular presentation systems.

Figure 6:
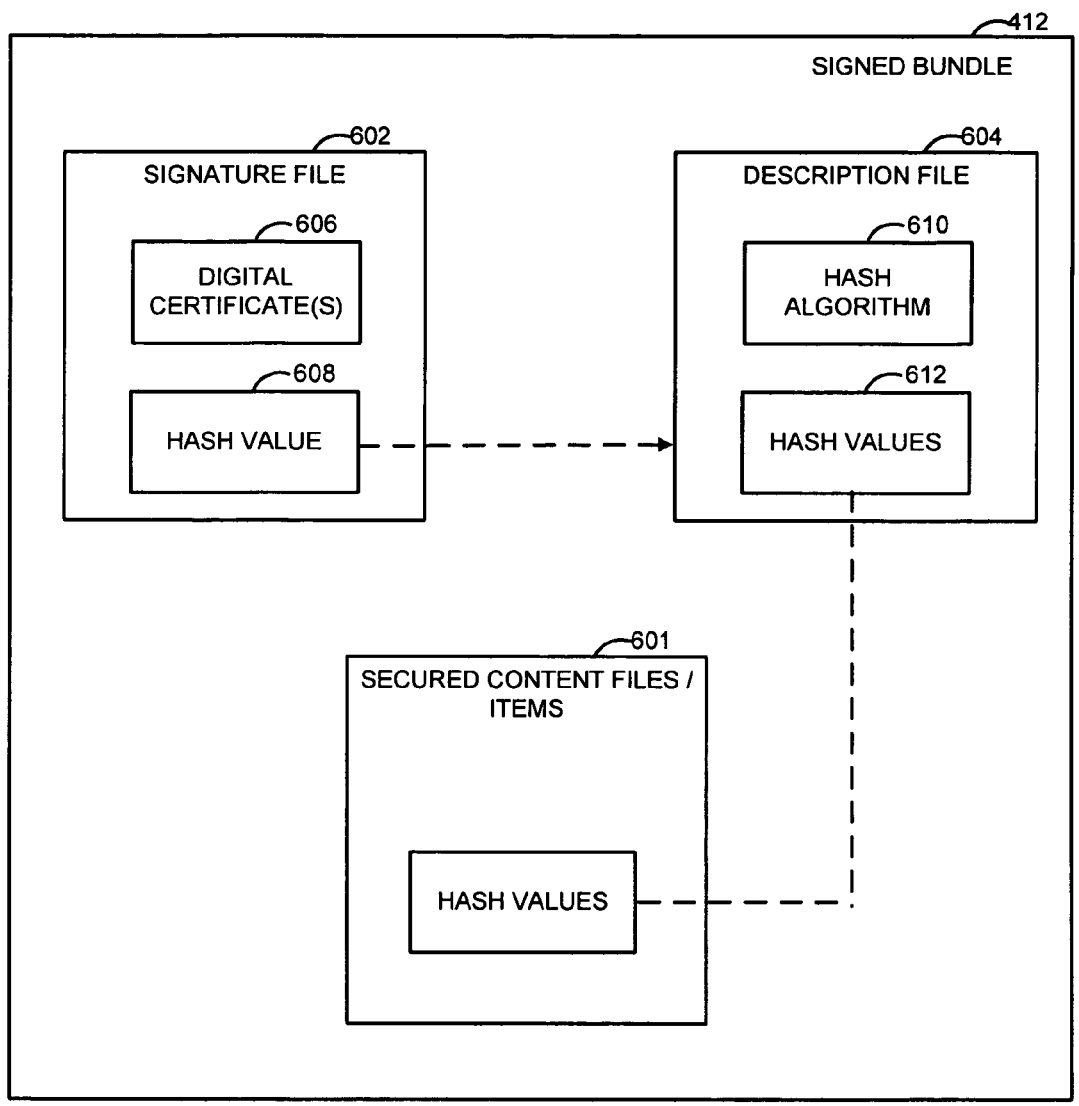
FIG. 6 is a simplified functional block diagram illustrating the relationship of certain files used by the interactive content authentication and authorization system of FIG. 4.

In the context of Presentation System 100/ICAA System 101, signed bundles 412 represent collections of files signed by a particular entity, which are used to identify/verify secured content. FIG. 6 is a simplified block diagram of an exemplary implementation of a single signed bundle 412. Signed bundle 412 may include one or more of the following files: (1) a playlist file (shown in FIG. 1) listing applications covered by the signed bundle; (2) a signature file 602, which includes a verifiable hash value 608 (the signature for description file 604) and a digital certificate 606 of the author/publisher that is generally issued by a third party certificate authority (digital certificate 606 may include a secure timestamp from a trusted server) but may be self-issued during development and at other times; (3) secured content files/items 601 covered by the signed bundle; and (4) a description file 604, which includes hash values 612 associated with items of secured content 601 and signature file 602, an identification of a hash algorithm 610 used to generate hashes 612 (suitable hash algorithms include but are not limited to the SHA-1 and SHA-256 algorithms), and optionally some additional metadata (not shown) about the signed bundle, such as the resource access permissions that the applications need or are requesting to provide certain user experiences (to provide interactive menus, graphic overlays, or animated thumbnails, for example). Although the files of signed bundles 412 may be located virtually anywhere, when the playlist is present, it may be convenient for the description and signature files to be in the same location as the playlist. It should be noted that if a presentation system does not recognize a particular hash algorithm 610, it may be desirable to treat description file 604 as invalid. An exemplary XML schema for a description file is set forth in the Specifications for High-Definition Video published by the DVD Forum, and is incorporated herein by reference for all purposes.

Referring again to FIG. 5, at block 510, assuming that required files, if any, are present, the digital identity/signature identified at block 502 is verified, to ensure that it is valid and comes from an entity trusted by the presentation system. Certain information, such as a verification algorithm corresponding to the signing algorithm, a public key associated with the author/publisher, or a list of trusted (or untrusted) entities may be accessed and used in the verification process. In the context of Presentation System 100, authentication engine 402 may verify that digital certificate 606 used in signature file 602 was issued by a trusted root 511, and verify that digital certificate 606 has not expired or been revoked. In addition, certain stored entity information 413, such as information about the trustworthiness of various entities, may be consulted.

If the digital identity/signature is not valid/verified at diamond 512 (for example, the digital certificate is not trusted or has been revoked, or a file has been tampered with), then it is desirable to deem the interactive multimedia presentation/interactive content invalid, as previously discussed in connection with block 508.

At block 514, assuming that the digital identity/signature was verified, then the required files identified at diamond 506 are verified. In one exemplary implementation, only one file, the description file, is verified, and other files are verified as they are loaded. In the context of Presentation System 100, exemplary tasks associated with verifying files associated with signed bundles 414, which may be performed by authentication engine 402, include verifying hash value 608 of signature file 602, verifying that the signature of description file 604 matches the public key in digital certificate 606, and verifying that hash values 612 of all secured content 601 loaded by all applications are correctly listed in description file 604.

If the required files are present but their contents are not valid/verified at diamond 517 (for example, a file has been tampered with), then as indicated at block 516, it is desirable to deem the interactive multimedia presentation/interactive content invalid, as previously discussed in connection with block 508. It will be appreciated invalidly signed or secured interactive content can be treated as less trusted than unsigned or unsecured interactive content. Authentication engine 402 may further include provisions for revoking digital certificates or secured content.

Assuming the contents of the required files are valid/verified at diamond 517, then as indicated at block 518, the contents of the files may be stored in memory for later use. In the context of Presentation System 100, the contents of description file 604 may be stored, including a list of all security-sensitive files and their cryptographic hashes and resource access/operating permissions requested or required by the applications (resource access/operating permissions are discussed further below).

Referring again to FIG. 5, various authentication status indicators 550 may be identified—for example, interactive content may be deemed invalid, unsigned, or validly signed and secured. It will be appreciated that other authentication status indicators 550 are possible. In the cases where applications are unsigned or validly signed and secured, the applications may be authorized to perform certain actions during play of the interactive multimedia presentation.

One factor in deciding what actions the applications are permitted to perform is based on the evaluation of a security policy, as indicated at block 520. A security policy is generally a set of criteria used to determine (optionally, based on one or more authentication status indicators 550), what level of trust interactive content is to be accorded, and in turn what resource access permissions the interactive content is entitle to receive (such as access to APIs, markup elements, interactive objects, memory locations, or network locations). The security policy may consider criteria such as predetermined resource access permission requirements and/or definitions, predefined entity-to-permission maps, authentication information regarding digital identities or required files, user inputs 521, permission requests 531, or other criteria, to determine a general level of trust/recommended access permissions for the applications. A particular security policy may be hard-coded into a particular presentation system, or it may allow for user interaction.

At diamond 522, based on evaluation of the security policy, and optionally considering other criteria such as user inputs/requests 521 or permission requests from applications (for example, via permission requests included in description file 604, or assumptions made about permissions requested by unsigned applications), it is determined whether to grant or deny certain resource access privileges to the applications. In one implementation, the set of resource access permissions recommended for availability to the applications based on evaluation of the security policy is compared to the actual set of resource access permissions requested by the applications via description file 604 (shown in FIG. 5 as permission requests 531). In some instances, users may be able to grant more, fewer, or different permissions than recommended based on evaluation of the security policy, and may be able to customize permissions on a per-entity or per-title basis. It is generally desirable, however, that applications receive the minimum resource access permissions needed to operate, so that operating failures because of missing permissions do not occur. In one possible implementation, applications can be considered to have two types of permissions—required permissions and requested permissions. An application will not play if it cannot be granted all of the required permissions; an application can play with zero or more requested permissions.

If it is determined at diamond 522 that no resource access privileges should be granted to the applications (for example, the applications or users request more permissions than can be, or are recommended to be, granted; a user decides not to play a certain optical disc; or certain content is known to be malicious or otherwise dangerous), it is desirable to deem the interactive multimedia presentation/interactive content invalid, as indicated at block 516 (treatment of invalid content is also discussed above, in connection with block 508).

If it is determined at diamond 522 that at least some resource access privileges should be granted to the applications, permissions to take certain actions are granted (via selection of an application operating mode) at block 524. In one exemplary implementation, three levels of resource access permissions/operating modes (in addition to the invalid operating mode), roughly corresponding to levels of trust, are available to applications: (1) unrestricted resource access permission (allowing trusted applications full access to available resources); (2) restricted resource access permission (allowing applications that are not known to be malicious but that may not be completely trusted to have access to certain predefined sets of resources); and (3) no resource access permission (allowing untrusted applications to access few, if any, resources). The resource access permission level/operating mode of an application generally determines a level of interactivity experienced by a user. For example, when applications have unrestricted resource access permissions, a user may receive/select all or a wide variety of interactive features offered by the applications, such as interactive menus, graphic overlays, animated thumbnails, and the like. When applications have restricted resource access permissions, the user may receive only basic interactive menus, which allow for play speed changes and title/chapter jumps. When applications have little, if any, resource access permissions, the user may not receive/select any interactive features, but may still be able to view the traditional video, audio, or data portion of the interactive multimedia presentation. It is possible to prompt a user for approval to grant individual permissions, although such customized user input may cause unpredictable playback.

Thus, various authorization status indicators 560 may be identified and used to determine various levels of application operating privileges. In the context of Presentation System 100, authorization engine 404 may be configured to access and evaluate security policy 414, user input(s) 521, and permission requests 531 to establish the appropriate authorization status 560/resource access permissions/application operating modes. It will be appreciated that virtually unlimited resource access permissions and combinations thereof may be defined and authorized. In one example, a special circumstance may exist for the testing of applications—to facilitate testing of applications, certain permissions may be granted even if content is not correctly signed. In another example, a stand-alone DVD player may implement a different security policy than a software player on a general-purpose computer with respect to the same interactive content. It is generally desirable to store some or all of the resource access permissions in memory for later use.

As indicated at block 526, once initial resource access privileges have been granted to the applications, the interactive multimedia presentation begins to play. During play of the interactive multimedia presentation, applications proceed to access various internal and external resources. When applications attempt to access certain predefined security-sensitive resources (such as execution of instructions that access certain script files/APIs, markup files/elements, manifest files, or user-defined file types, computer-readable media locations, or external networks), it may be desirable to verify that the applications have been granted authorization to access the requested resources and/or to verify the integrity of certain resources themselves via cryptographic hashes, prior to actually allowing the application to access or load such resources during play. Generally, files and other items have verifiable hash values; other resources (such as APIs or access to devices) are often handled by looking up the resource in a data structure used to indicate whether certain resources are available for access or not.

In one possible implementation, security-sensitive resources that should undergo (re-)authorization for use and/or hash verification are identified using verification flags. For example, certain secured resources 601 listed in description file 604 may have one or more associated verification flags, which may be set to one value if a resource access permission or hash is to be verified during application play, and which are set to another value if a resource access permission or hash verification is not necessary during application play. In one scenario, there are two flags. One flag is a "skip-verification flag", which indicates whether a hash check should be performed (although an error may not occur if the hash check fails). The second flag is a "force-check flag", which is used to indicate that a hash check should be performed even if the resource is not identified as a securable and/or secured resource. In another possible implementation, security-sensitive resources requiring authorization and/or verification are identified in other manners, such as by inclusion in a set of predetermined file types, or having names that match a particular pattern, or inclusion in a list of secured files having hash values.

Figure 7:
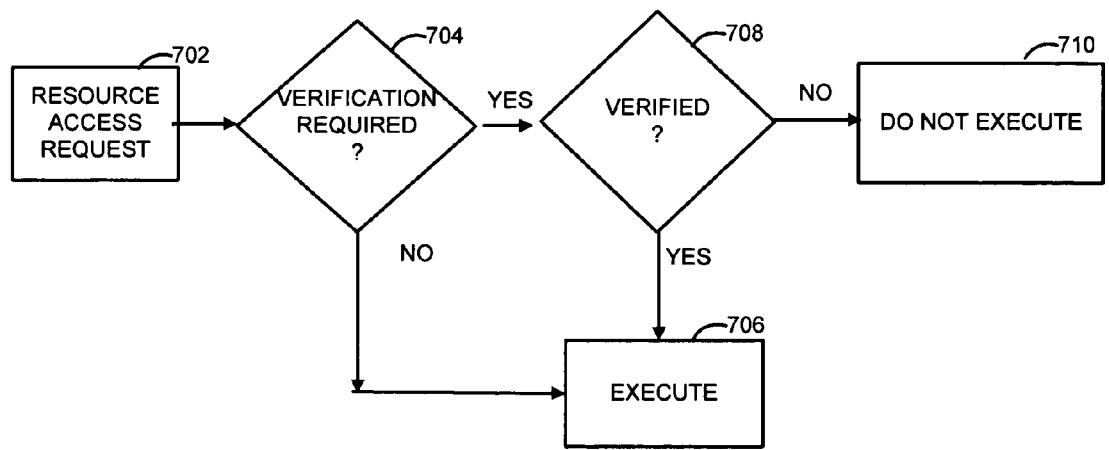
FIG. 7 is a flowchart of a method for using aspects of the interactive content authentication and authorization system of FIG. 4 to make certain authorization decisions.

FIG. 7 is a flowchart of one exemplary method for making authorization decisions during play of applications/interactive multimedia presentations. In the context of Presentation System 100, the method of FIG. 7 may be implemented by resource verification engine 406 of ICAA System 101, with access to resource identifiers/flags 416. The method begins at block 702, where a resource access request is identified. For example, an instruction 304 of a particular application 155 is identified which, when executed, accesses a security-sensitive resource identified via resource identifiers/flags 416 (which may be listed in description file 604). The resource may have a predetermined field type or name that matches a particular pattern, for example, or the force-check flag may be set. At diamond 704, it is determined whether it is desirable to verify (or re-verify) the application's authorization to access the requested resource and/or verify the hash value of the requested resource. For example, values of one or more verification flags associated with the requested resource may be ascertained. If verification is not required, or if verification is required and obtained at diamond 708, the resource access request is executed as indicated at block 706. If verification is required but not obtained at diamond 708 (for example, permission to access the resource is denied by the presentation system or by a user, or the resource has been tampered with), then the resource access request is not executed. If resource access permissions are denied during application play, it may be desirable to either stop application play or to provide/handle the error and continue to play the application. In one possible implementation (for example, in the case where a hash value for a security-critical file does not match the hash value stored in memory), the application or the interactive multimedia presentation may be deemed invalid and cease to play. In another possible implementation (for example, in the case where an application attempts to access an insecure network location to load additional signed content not stored with the original presentation materials), errors are handled on an individual basis and the interactive multimedia presentation/interactive content may continue to play. It will be appreciated that virtually unlimited responses to unverifiable resources/resource accesses are possible.

Figure 8:
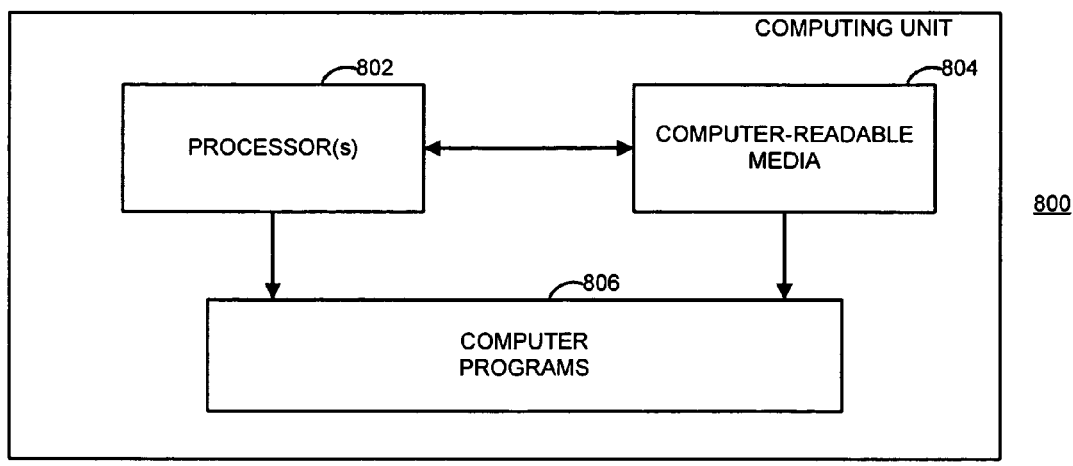
FIG. 8 is a simplified functional block diagram of a general-purpose computing unit usable in connection with aspects of the interactive multimedia presentation system shown in FIG. 1.

FIG. 8 is a block diagram of a general-purpose computing unit 800, illustrating certain functional components that may be used to implement, may be accessed by, or may be included in, various functional components of Presentation System 100. One or more components of computing unit 800 may be used to implement, be accessible by, or be included in, IC manager 104, presentation manager 106, and media content manager 102. For example, one or more components of FIG. 8 may be packaged together or separately to implement functions of Presentation System 100 (in whole or in part) in a variety of ways.

A processor 802 is responsive to computer-readable media 804 and to computer programs 806. Processor 802, which may be a real or a virtual processor, controls functions of an electronic device by executing computer-executable instructions. Processor 802 may execute instructions at the assembly, compiled, or machine-level to perform a particular process. Such instructions may be created using source code or any other known computer program design tool.

Computer-readable media 804 represent any number and combination of local or remote devices, in any form, now known or later developed, capable of recording or storing computer-readable data, such as the instructions executable by processor 802. In particular, computer-readable media 804 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer programs 806 represent any signal processing methods or stored instructions that electronically control predetermined operations on data. In general, computer programs 806 are computer-executable instructions implemented as software components according to well-known practices for component-based software development, and encoded in computer-readable media (such as computer-readable media 804). Computer programs may be combined or distributed in various ways.

Functions/components described in the context of Presentation System 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of Presentation System 100.

Figure 9:
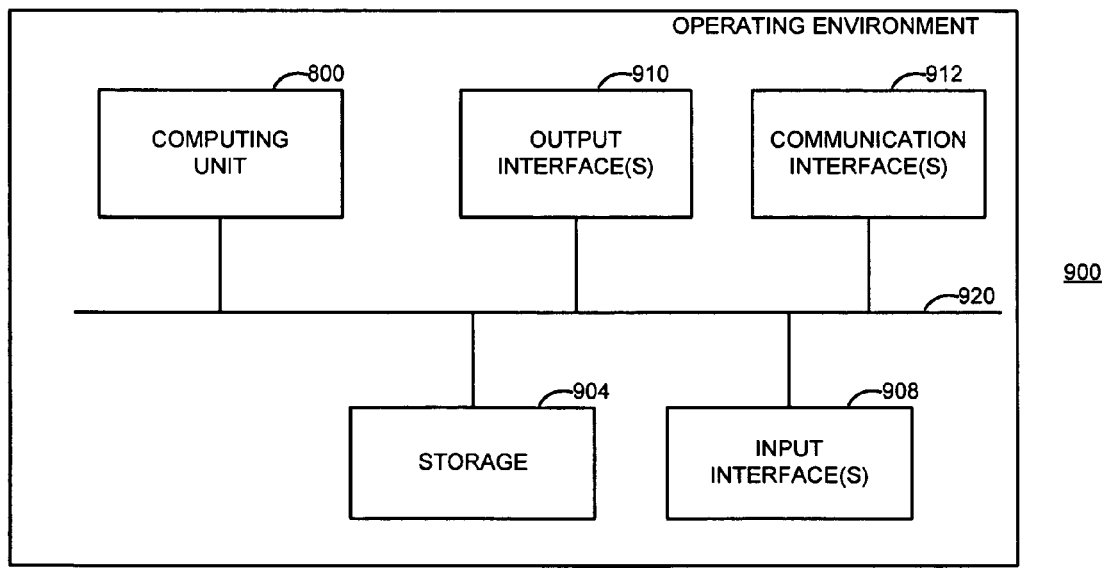
FIG. 9 is a simplified functional block diagram of an exemplary configuration of an operating environment in which aspects of the interactive multimedia presentation system shown in FIG. 1 may be implemented or used.

With continued reference to FIG. 8, FIG. 9 is a block diagram of an exemplary configuration of an operating environment 900 in which all or part of Presentation System 100 may be implemented or used. Operating environment 900 is generally indicative of a wide variety of general-purpose or special-purpose computing environments. Operating environment 900 is only one example of a suitable operating environment and is not intended to suggest any limitation as to the scope of use or functionality of the system(s) and methods described herein. For example, operating environment 900 may be a type of computer, such as a personal computer, a workstation, a server, a portable device, a laptop, a tablet, or any other type of electronic device, such as an optical media player or another type of media player, now known or later developed, or any aspect thereof. Operating environment 900 may also be a distributed computing network or a Web service, for example. A specific example of operating environment 900 is an environment, such as a DVD player or an operating system associated therewith, which facilitates playing high-definition DVD movies.

As shown, operating environment 900 includes or accesses components of computing unit 800, including processor 802, computer-readable media 804, and computer programs 806. Storage 804 includes additional or different computer-readable media associated specifically with operating environment 800, such as an optical disc or other removable or non-removable storage. One or more internal buses 920, which are well-known and widely available elements, may be used to carry data, addresses, control signals and other information within, to, or from computing environment 800 or elements thereof.

Input interface(s) 908 provide input to computing environment 900. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 910 provide output from operating environment 900. Examples of output interface(s) 910 include displays, printers, speakers, drives (such as optical disc drive 906 and other disc drives), and the like.

External communication interface(s) 912 are available to enhance the ability of operating environment 900 to receive information from, or to transmit information to, another entity via a communication medium such as a channel signal, a data signal, or a computer-readable medium. External communication interface(s) 912 may be, or may include, elements such as cable modems, data terminal equipment, media players, data storage devices, personal digital assistants, or any other device or component/combination thereof, along with associated network support devices and/or software or interfaces.

Figure 10:
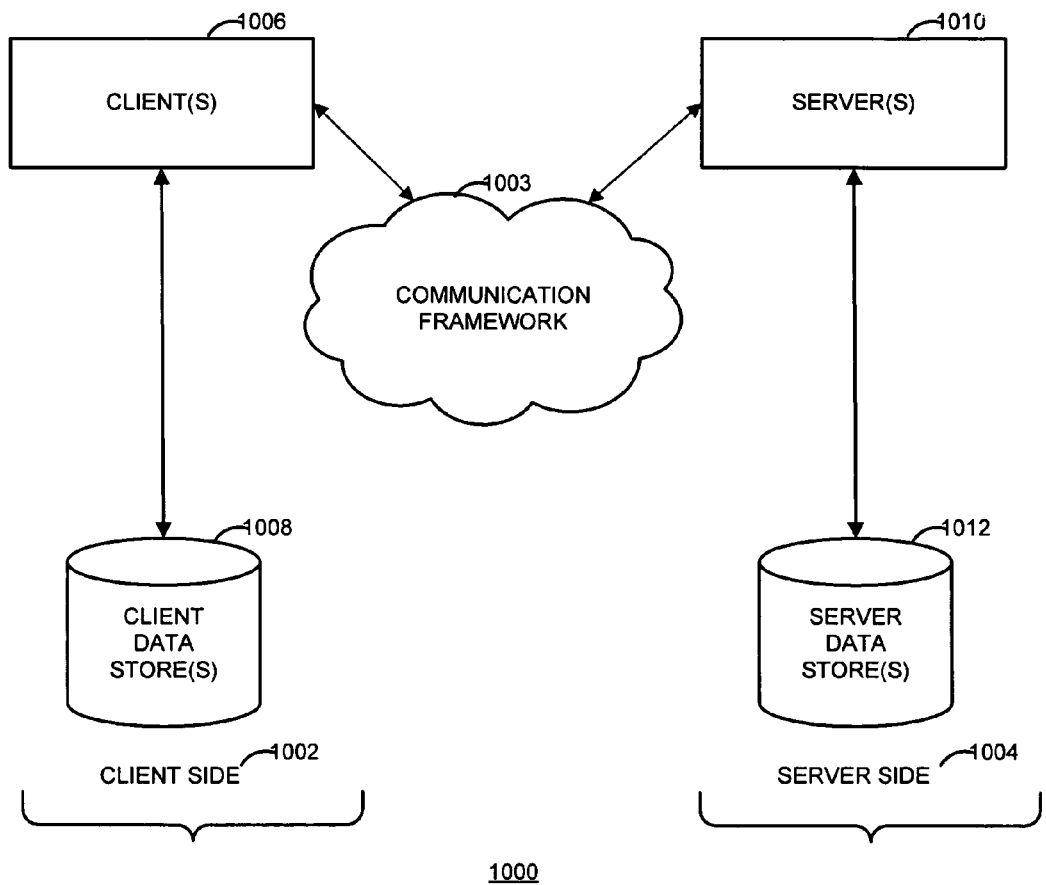
FIG. 10 is a simplified functional diagram of a client-server architecture in which aspects of the presentation system shown in FIG. 1 may be implemented or used.

FIG. 10 is a simplified functional diagram of a client-server architecture 1000 in connection with which the Presentation System 100 or operating environment 900 may be used. One or more aspects of Presentation System 100 and/or operating environment 900 may be represented on a client-side 1002 of architecture 1000 or on a server-side 1004 of architecture 1000. As shown, communication framework 1003 (which may be any public or private network of any type, for example, wired or wireless) facilitates communication between client-side 1002 and server-side 1004.

On client-side 1002, one or more clients 1006, which may be implemented in hardware, software, firmware, or any combination thereof, are responsive to client data stores 1008. Client data stores 1008 may be computer-readable media 804, employed to store information local to clients 1006. On server-side 1004, one or more servers 1010 are responsive to server data stores 1012. Like client data stores 1008, server data stores 1012 may include one or more computer-readable media 804, employed to store information local to servers 1010.

Various aspects of a presentation system that is used to present interactive content to a user synchronously with media content have been described. It will be understood, however, that all of the described components of the presentation system need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for selecting an operating mode for an application to be played via an optical disc player, the application operable to play an interactive content component of an interactive multimedia presentation, the application having computer-executable instructions, the method comprising:

ascertaining an authentication status of an entity that authored or published the application, the authentication status indicating whether the entity is recognized;

receiving a request from the application for required resource access permissions and optional resource access permissions to access resources the interactive content component is entitled to receive, the required resource access permissions comprising minimum permissions needed for the application to play;

based on the request, evaluating a security policy to determine a first level of trust associated with the application, the first level of trust indicating a set of resource access permissions recommended for availability to the application; and based on the authentication status, the request and the first level of trust, ascertaining an authorization status of the application, the authorization status indicating whether the application enters a first operating mode or a second operating mode, in the first operating mode, granting all of the required resource access permissions to the application and one or more of the optional resource access permissions to the application, in the second operating mode, not granting one or more of the required resource access permissions, and not permitting the application to execute, to prevent operating failures because of missing permissions needed by the application for execution from occurring.

2. The method according to claim 1, wherein the step of evaluating the security policy comprises evaluating the security policy based on the authentication status.

3. The method according to claim 1, wherein the required resource access permissions and the optional resource access permissions comprise execution of computer-executable instructions of the application.

4. The method according to claim 1, wherein the required resource access permissions and the optional resource access permissions comprise accessing a network, or accessing a location in a computer-readable memory.

5. The method according to claim 1, further comprising:
deciding to receive a user input affecting the authorization status; and
in response to the deciding, evaluating the user input to determine a second level of trust associated with the application, the second level of trust indicating a recommendation of a user regarding whether the application should,
enter the first mode of operation or the second mode of operation.

6. The method according to claim 1, wherein the step of ascertaining an authentication status of an entity comprises
identifying a digital identity associated with the application, the authentication status indicating whether the digital identity is recognized.

7. The method according to claim 6, wherein when present, the digital identity comprises a signed digital certificate.

8. The method according to claim 1, wherein the step of ascertaining an authentication status of an entity comprises
identifying a predetermined file stored in a predetermined location, and
verifying a signed hash associated with the predetermined file.

9. An optical disc player system for playing an application having computer-executable instructions operable to play an interactive content component of an interactive multimedia presentation, the system comprising:
a computer-readable storage medium device; and
a hardware processor responsive to the computer-readable storage medium device and to a computer program, the computer program, when loaded into the hardware processor, operable to
in response to a request to play the application, arrange for access to a plurality of data structures, the plurality of data structures comprising
a first data structure having information identifying a digital identity of an entity that authored or published the application, and
a second data structure having information identifying hash values associated with the application,
based on the access to the plurality of data structures, ascertain an authentication status of the entity that authored or published the application, the authentication status indicating whether the system recognizes the entity,
receive a request from the application for required resource access permissions and optional resource access permissions to access resources the interactive content component is entitled to receive, the required resource access permissions comprising minimum permissions needed for the application to play,
based on the access to the plurality of data structures and the request, evaluate a security policy to determine a level of trust associated with the application, the level of trust indicating a set of resource access permissions recommended for availability to the application, and
based on the authentication status, the request and the level of trust, ascertain an authorization status of the application, the authorization status indicating whether the application has a first operating mode or a second operating mode, in the first operating mode, granting all of the required resource access permissions to the application and one or more of the optional resource access permissions to the application, in the second operating mode, not granting one or more of the required resource access permissions, and not permitting the application to execute, to prevent operating failures because of missing permissions needed by the application for execution from occurring.

* * * * *